United States Patent [19]

Kolb

[11] 3,893,204
[45] July 8, 1975

[54] WINDSHIELD WIPER
[75] Inventor: Erich Kolb, Buhl-Eisental, Germany
[73] Assignee: Robert Bosch G.m.b.H., Stuttgart, Germany
[22] Filed: Oct. 10, 1973
[21] Appl. No.: 405,141

[30] Foreign Application Priority Data
Oct. 14, 1972 Germany............................ 2250509

[52] U.S. Cl. .......................... 15/250.23; 15/250.32
[51] Int. Cl. ............................ B60s 1/32; B60s 1/40
[58] Field of Search....... 15/250.23, 250.21, 250.31, 15/250.32, 250.35

[56] References Cited
UNITED STATES PATENTS

| | | | |
|---|---|---|---|
| 2,849,742 | 9/1958 | Gores | 15/250.23 |
| 3,085,277 | 4/1963 | Bock et al. | 15/250.32 |
| 3,128,490 | 4/1964 | Alfieri | 15/250.23 |
| 3,404,423 | 10/1968 | Howard et al. | 15/250.23 |
| 3,418,678 | 12/1968 | Deibel et al. | 15/250.23 |
| 3,600,739 | 8/1971 | Mower | 15/250.23 |
| 3,688,334 | 9/1972 | Peterson | 15/250.23 |

Primary Examiner—Peter Feldman
Attorney, Agent, or Firm—William R. Woodward

[57] ABSTRACT

A control bracket that can be made in one piece from sheet metal has two arms at right angles, one of them having a U-shaped hook for mounting the wiper blade of a windshield wiper and the other having two bent over ends through which a rivet passes to provide a pivot, in one case for the wiper arm and in the other case for the control arm that causes the wiper blade to swing with respect to the wiper arm. The bent over ends provide bearing surfaces on both sides of the arms and include space for anti-friction washers between each side of the arm and the opposite bearing surface of the control bracket.

9 Claims, 4 Drawing Figures

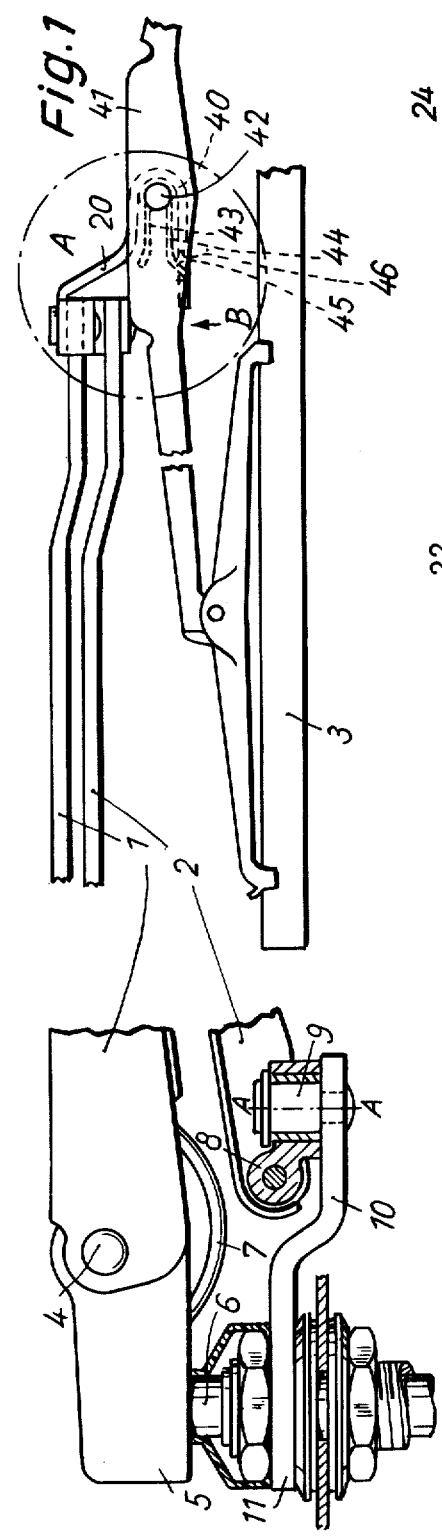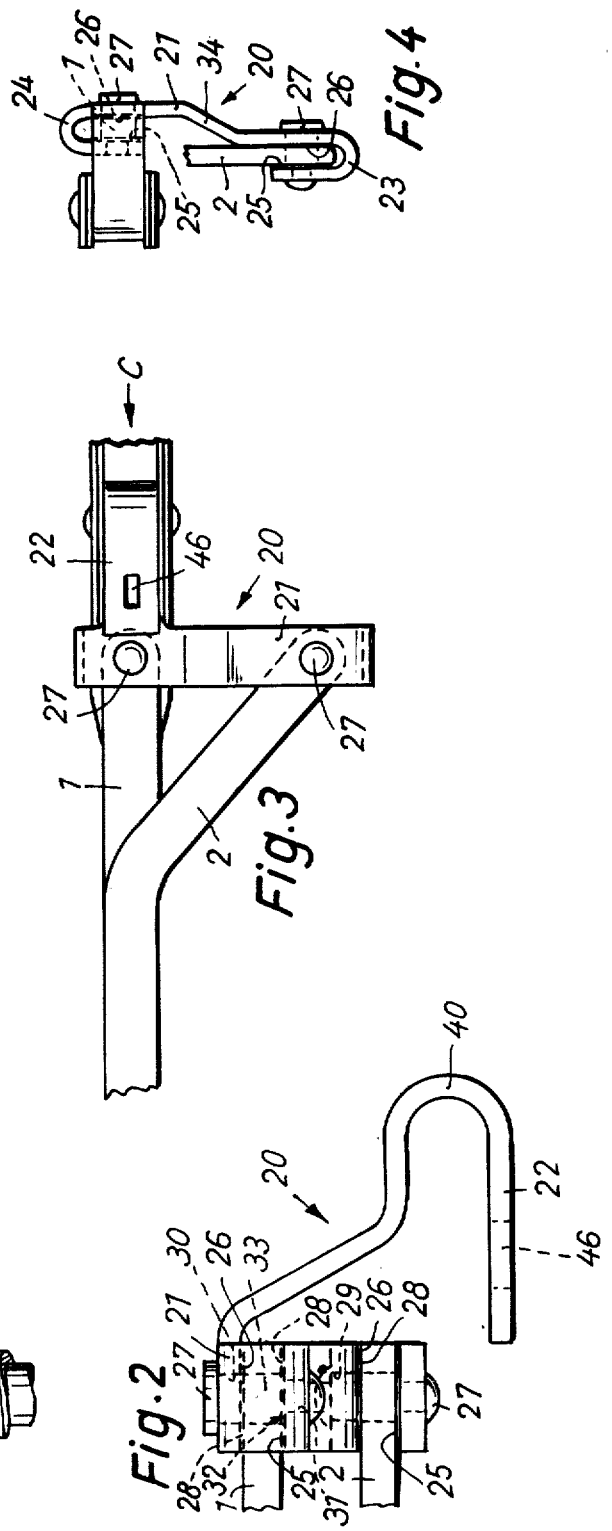

WINDSHIELD WIPER

This invention relates to windshield wipers for motor vehicles in which the wiper blade is pivotally mounted on a power-driven wiper arm and on a control arm that provides for a relative rotation of the blade with respect to the wiper arm.

Windshield wipers of the type described, with controlled wiper blades, have the advantage that the wiper blades in all phases of their movement are nearly parallel to the prevailing air stream direction on the windshield, so that the danger of the blade being blown off the surface at higher vehicle speeds is avoided. In addition, such wiper mechanisms generally provide an increase of the wiper sweep and, at least, the reach of the wiper conforms better to the shape of the windshield to be cleaned.

One wiper mechanism is already known in which the wiper arm and the control arm are pivotally riveted to a control bracket. In this known mechanism a pin or stud is fastened to the control bracket which protrudes sideways into the mounting strip of the wiper blade and is caught or snapped in there, so that the wiper blade is hung on the control bracket on a pivot about which it can swing. The pin or stud, which is to be regarded as an intermediate member, is, in the conventional structure, therefore, a separate component which must be riveted fast onto the control bracket. There is the further disadvantage that both the wiper arm and the control arm bear against the control bracket on only one of their sides, and must therefore bear against the head of the rivet on the other side. After long periods of operation it could accordingly occur with this type of windshield wiper that the linkage between the wiper arm and the control arm on one hand and the control bracket on the other, gets stressed out of shape to such an extent that the entire wiper mechanism becomes unusable.

Another type of windshield wiper mechanism is known in which the wiper arm and the control arm are held to the control bracket by means of a grooved rivet. In this form too, the respective ends of the wiper arm and of the control arm bear against the control bracket only on one side and are supported on the other side by the head of the grooved rivet. This arrangement, too, fails to provide a trouble-free bearing end connection between the control bracket on one hand and the wiper arm and the control arm on the other hand. It is the object of the present invention to provide such a trouble-free bearing end connection.

Subject matter of the present invention: Briefly, the control bracket is provided with tongues bent over in U-shape to provide opposed bearing surfaces, in one case for engagement with the control arm and in the other case for engagement with the wiper arm, and in each case a pin or rivet is provided that passes through both surfaces as well as the arm engaged therein. The U-shaped bending over is of course just one particularly convenient way of providing the opposed surfaces for engagement with the end of the arm and for supporting a pin passing through both opposed surfaces as well as the arm. The arms are thus led between relatively large surfaces on both sides, so that even after long periods of use they cannot become canted against the pin so as to interfere with the effectiveness of operation. The stability of the connection between the arms and the control bracket is also substantially increased.

In a particularly advantageous form of the invention the control bracket has two arms extending in at least approximately perpendicular directions. One of these arms forms the intermediate member for holding the wiper blade, and the other provides the opposed surfaces and pivot pins for the wiper arm and the control arm. The latter, when seen from the side, has reverse bends with an intermediate straight section and the ends are bent again to provide the second bearing surface for the wiper arm in one case and the control arm in the other, one of these bent over ends being bent clockwise and the other counterclockwise as seen from the side, so that the wiper arm and the control arm are linked to the control bracket in different planes. In this way it is possible for the control arm and the wiper arm to be disposed one over the other without their movements interfering with each other.

In order to reduce friction and wear between the arms and the control bracket, a further improved embodiment of the invention includes anti-friction washers between the wiper arm and its bearing surfaces on the control bracket and likewise between the control arm and its bearing surfaces on the control bracket. The rivets pass through these washers just as they pass through the surfaces they protect. The waashers are preferably made of synthetic material or of a suitable metallic material.

The control bracket is preferably made integral with the intermediate piece or link member on which the wiper blade is hung. It can be made so from a single strip of sheet metal. This feature can be utilized independently of the other features of the invention described above, and it is particularly advantageous if the extension of the control bracket which serves as the intermediate member for the wiper blade has the form of a U-shaped bent over hook in which the wiper blade can be hung.

The invention will be described by way of examaple with respect to the accompanying drawing, wherein:

FIG. 1 is a side view, partly broken away, of the wiper arm, control arm and wiper blade illustrating the mechanism of the invention;

FIG. 2 is an enlarged representation of the inset circle A of FIG. 1 with the wiper blade removed;

FIG. 3 is a partial view in the direction of the arrow B of FIG. 1, and

FIG. 4 is a partly view in the direction of the arrow C of FIG. 3.

FIG. 1 shows a wiper arm 1, a control arm 2 and a wiper blade 3 which come together in the inset circle A at the right of the figure. At the left of the figure is shown the mounting of the wiper and control arms on their pivots. The wiper arm is mounted by means of a pin 4 on a stub arm 5, so that it can swing towards and away from the windshield pivoting on the pin 4. The stub arm 5 is fixed to a power-driven axle 6. A spring 7 is provided to press the wiper arm, and hence also the wiper blade 3 hung on the wiper arm 1, against the windshield or window pane to be cleaned.

The control arm 2 is pivoted on a mounting detail 8 which is in turn mounted on a bearing at the end of the lever 10, provided by the bearing pin 9, so that the control arm 2 may swing about the axis A-A. The other end 11 of the lever 10 is perforated and affixed to the axle 6.

The wiper arm 1 and the control arm 2 are connected to a control bracket 20 at their outer ends, as shown at the right in FIG. 1. The control bracket 20, as shown particularly in FIG. 3, has two arms 21 and 22 extending at right angles to each other. The ends 23 and 24 of the arm 21 are bent over in U shape, in each case providing a second bearing surface 25, in one case for the wiper arm 1 and in the other case for the control arm 2. The other bearing surface 26 is in each case provided by the flat side surface of the portion of the control bracket 20 which is not bent over.

As seen in FIG. 4, the end tongue 23 is bent over in the clockwise direction, whereas the other end tongue 24 is bent over in the opposite direction. The wiper arm 1 and the control arm 2 thus lie against the same side of the control bracket 20. They are each pivotally mounted on the control bracket 20 by means of a rivet 27. This rivet has a shank that is turned down at the end, so that the distance between the bearing surfaces 25 and 26 will after riveting remain not less than the thickness of the wiper arm 1 (or the control arm 2) plus combined thickness of the two washers 28, which are provided for reduction of friction and wear, one of them being provided between each arm and the bearing surface 25 and another being provided between each arm and the bearing surfaces 26. The perforations of the control bracket 20 and its bent over ends 23 and 24, as well as in the wiper arm 1 and the control arm 2 which the respective rivets 27 pass through, are designated 29, 30 and 31 in FIG. 2. The holes 29 and 30 have the same diameter, which corresponds to the diameter of the shank of the rivet 27. The diameter of the hole 31, however, is somewhat smaller, so that the bent over ends 23 and 24 are supported on the shoulder 32 formed by turning down the end of the rivet shank at 33 to pass through the hole 31, thus preventing the bearing surfaces from being pressed further together during riveting.

The arm 21 of the control bracket 20 is provided with reverse bends on sides of the mid-portion 34 so as to offset the respective bearings of the wiper arm 1 and the control arm 2, which are thus pivoted on the control bracket 20 in different planes. In this way it is made possible for the wiper arm 1 and the control arm 2 to be exactly one over the other vertically in the rest position of the windshield wiper, so that only one of the two is visible from in front.

The second arm 22 of the control bracket 20 has its free end bent over into a U-shaped hook 40, in which the wiper blade 3 can be hung. For this purpose a stud 42 is provided on the mounting yoke or bail strip 41, and the stud 42 is gripped by a two-armed spring clip 43. One arm 44 of the spring clip 43 has a projection 45 arranged to catch into a corresponding cavity or perforation 46 in the arm 22 of the control bracket 20. The wiper blade 3 is thereby hung so that it can swing on the control bracket 20.

The control bracket 20, including the U-shaped hook 40 serving as the intermediate or link piece for mounting the wiper, is made in one piece out of a single piece of sheet metal. The control bracket 20 is accordingly very simple to manufacture. The wiper arm 1 and the control arm 2 are pivoted on the control bracket 20 in such a way that bearing surfaces are provided on both sides, so that even after a long period of use trouble-free operation of the wiper mechanism is assured. In addition, there is the further particular advantage that wiper blades can be fastened to this control bracket in the same way as they have heretofore been fastened to wiper mechanisms not equipped with a control arm.

Although the invention has been described with respect to a particular embodiment, it will be understood that variations may be made within the inventive concept.

I claim:

1. A windshield wiper mechanism for a motor vehicle for use with a replaceable wiper blade, comprising:
   a control bracket having a first arm (22) serving as a link member for pivotally holding said wiper blade, and
   a power-driven wiper arm and a control arm both pivotally connected to said wiper blade by said control bracket so as to allow rotation of said wiper blade relative to said wiper arm,
   said control bracket (20) being made of sheet metal and having a second arm (21) a portion of which separates the places at which said wiper arm and said control arm are respectively attached pivotally to said control bracket and having bent over tongues providing U-shaped portions at both said attachment places to hold respective mounting rivet members passing through said wiper arm and said control arm respectively and to provide, on the inside of the U-shape, a pair of opposed bearing surfaces (25, 26) of said control bracket, one of said pairs of surfaces engaging surfaces of said wiper arm and the other engaging surfaces of said control arm, said second arm (21) of said control bracket having a portion reversely bent, as seen from the side, between said attachment places, which portion includes a straight portion between mutually reverse bends.

2. A windshield wiper mechanism as defined in claim 1 in which said first and second arms (22, 21) of said control bracket (20) extend in directions approximately perpendicular to each other.

3. A windshield wiper mechanism as defined in claim 1 in which one end (23) of said control bracket as seen from the side is bent over clockwise and the other end (24) counterclockwise to provide said U-shaped portions, so that said wiper arm (1) and said control arm (2) are linked to opposite flat sides of the midportion of said second arm of said control bracket (20).

4. A windshield wiper mechanism as defined in claim 1 in which anti-friction washers (28) are provided between said wiper arm (1) and one pair of opposed bearing surfaces (25, 26) of said control bracket and between said control arm (2) and the other pair of opposed bearing surfaces (25, 26) of said control bracket.

5. A windshield wiper mechanism as defined in claim 4 in which said anti-friction washers (28) are made of synthetic resin material.

6. A windshield wiper mechanism as defined in claim 4 in which said anti-friction washers (28) are made of a suitable metallic material.

7. A windshield wiper mechanism as defined in claim 1 in which said rivet members (27) are provided with shanks that are turned down at their extremity to provide a shoulder for the respective bent over tongues of said control bracket.

8. A windshield wiper mechanism as defined in claim 1 in which said control bracket (20) inclusive of said first arm (22) serving as a link member for holding said wiper blade is made in one piece of a strip of sheet metal.

9. A windshield wiper mechanism as defined in claim 8 in which said first arm of said control bracket serving as a link member is in the form of a U-shaped bent over hook (40).

* * * * *